H. S. BARTHOLOMEW.
Improvement in Ball Braces.
No. 4,518. Reissued Aug. 22, 1871.
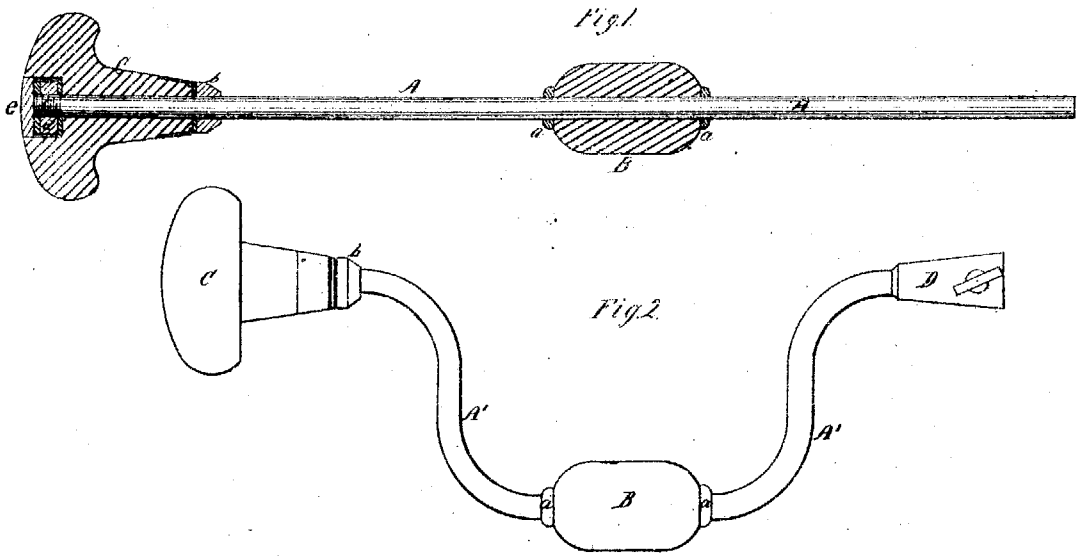
Witnesses.
C. D. Wright
Charles Shinn
Inventor
H. S. Bartholomew by
H. W. Beadle
atty.
AM. PHOTO-LITHOGRAPHIC CO. N.Y. (OSBORNE'S PROCESS.)

UNITED STATES PATENT OFFICE.

HARRY S. BARTHOLOMEW, OF BRISTOL, CONNECTICUT.

IMPROVEMENT IN BIT-BRACES.

Specification forming part of Letters Patent No. 32,347, dated May 21, 1861; reissue No. 1,351, dated November 4, 1862; reissue No. 4,518, dated August 22, 1871.

DIVISION A.

*To all whom it may concern:*

Be it known that I, HARRY S. BARTHOLOMEW, of Bristol, in the county of Hartford and State of Connecticut, have invented certain new and useful Improvements in Ball-Braces, of which the following is a specification:

My invention consists in the employment of an undivided ball-shaped hand-block applied to the bow-shaped part of a bit-brace.

In the accompanying drawing, Figure 1 is a section showing my invention in an incompleted state, and Fig. 2 is a side elevation of my invention.

A tubular, oval, or ball-shaped hand-block, B, consisting of a single undivided piece of wood or other material, is slipped upon the rod A before said rod is bent, and confined at the proper point in any practical manner. In the drawing two collars, *a a*, which snugly fit the rod A, are driven against or near the ends of the block B, thus securing the same in place while the block B is free to revolve upon the rod A. The ball or hand-block B may be secured in many other ways, as by a groove and pin. After the ball B is secured in place the rod A is formed into the bow-shaped part of the brace, as shown in Fig. 2. The breast-block C and bit-holder D can be secured in any proper manner.

By my invention I produce a hand-block for bit-braces which can be made and secured at a less cost than any other heretofore used. It is much stronger and presents a much smoother surface to the hands of the operator than divided and pinned ball.

I claim as my invention—

The ball-brace A′, provided with an undivided hand-block, B, fitted upon its bow-shaped portion, substantially as and for the purposes described.

HARRY S. BARTHOLOMEW.

Witnesses:
JAMES SHEPARD,
HENRY GOODNOW.